United States Patent [19]

Gaffney

[11] E Re. 30,867

[45] Reissued Feb. 16, 1982

[54] TRAVEL CHAIR

[75] Inventor: Edward J. Gaffney, Pewaukee, Wis.

[73] Assignee: Orthokinetics, Incorporated, Waukesha, Wis.

[21] Appl. No.: 135,602

[22] Filed: Mar. 31, 1980

Related U.S. Patent Documents

Reissue of:

[64] Patent No.: 3,891,229
Issued: Jun. 24, 1975
Appl. No.: 451,251
Filed: Mar. 14, 1974

[51] Int. Cl.[3] ..... B62B 11/00

[52] U.S. Cl. ..... 280/642; 297/DIG. 4

[58] Field of Search ..... 280/642, 641, 30, 643, 280/52, 31; 297/DIG. 4

[56] References Cited

U.S. PATENT DOCUMENTS

| | | | |
|---|---|---|---|
| 1,140,085 | 5/1915 | Turner | 280/644 |
| 1,693,633 | 12/1928 | Allen | 280/31 |
| 1,835,840 | 12/1931 | Barclay | 296/65 R |
| 1,940,523 | 12/1933 | Barclay | 280/43.17 |
| 2,470,040 | 5/1949 | Mackin | 280/643 |
| 2,805,076 | 9/1957 | Thomas | 280/643 |
| 3,109,666 | 11/1963 | Wilson | 280/39 |
| 3,336,039 | 8/1967 | Chute | 280/642 |

*Primary Examiner*—Robert R. Song
*Attorney, Agent, or Firm*—Wheeler, House, Fuller & Hohenfeldt

[57] ABSTRACT

The front wheel assembly of a wheel chair is dimensioned so that it will easily pass through the space between the seat of an automobile and the doorframe thereof. The rear wheel assembly is retractable upwardly under the seat portion to a position which permits the seat portion and the retracted rear wheel assembly to be set upon the automobile seat. The wheel chair and the person seated therein may be easily placed on the automobile seat and removed therefrom while the person remains seated in the wheel chair.

11 Claims, 9 Drawing Figures

TRAVEL CHAIR

Matter enclosed in heavy brackets [ ] appears in the original patent but forms no part of this reissue specification; matter printed in italics indicates the additions made by reissue.

BACKGROUND OF THE INVENTION

This invention relates to wheel chairs, particularly for children. In the past, when a wheel chair bound person was to be driven from one place to another in a standard passenger automobile, it was necessary to move the wheel chair adjacent to the automobile and then transfer the disabled person from the wheel chair seat to the automobile seat. Special folding wheel chairs were used which could be folded up and carried in the automobile. When the destination was reached, the folding wheel chair was taken out, unfolded, placed next to the automobile and then the disabled person was transferred from the automobile seat to the wheel chair seat. This procedure is difficult and time consuming, both for the disabled person and the person assisting him. As a result, wheel chair bound persons are usually only transported by automobile when it is necessary to do so. In accordance with this invention, however, a novel wheel chair has been devised which greatly simplifies the process of moving a wheel chair bound person by automobile.

SUMMARY OF THE INVENTION

In accordance with the present invention, the wheel chair travels with the patient, who never leaves the wheel chair. The undercarriage of the wheel chair is foldable to facilitate maneuvering the chair through the automobile door. In its folded position, the wheel chair is supported on the automobile seat. For these purposes, the front wheel assembly of the wheel chair is dimensioned so that it will easily pass through the space between the seat of an automobile and the doorframe thereof. The rear wheel assembly is retractable upwardly under the seat portion to a position which permits the seat portion and the retracted rear wheel assembly to be set upon the automobile seat. The undercarriage is arched by bowing it upwardly, so that it will clear the front edge of the automobile seat. The wheel chair and the person seated therein may be easily placed on the automobile seat and removed therefrom while the person remains seated in the wheel chair.

Other objects, features and advantages of the invention will appear from the disclosure hereof.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 6:
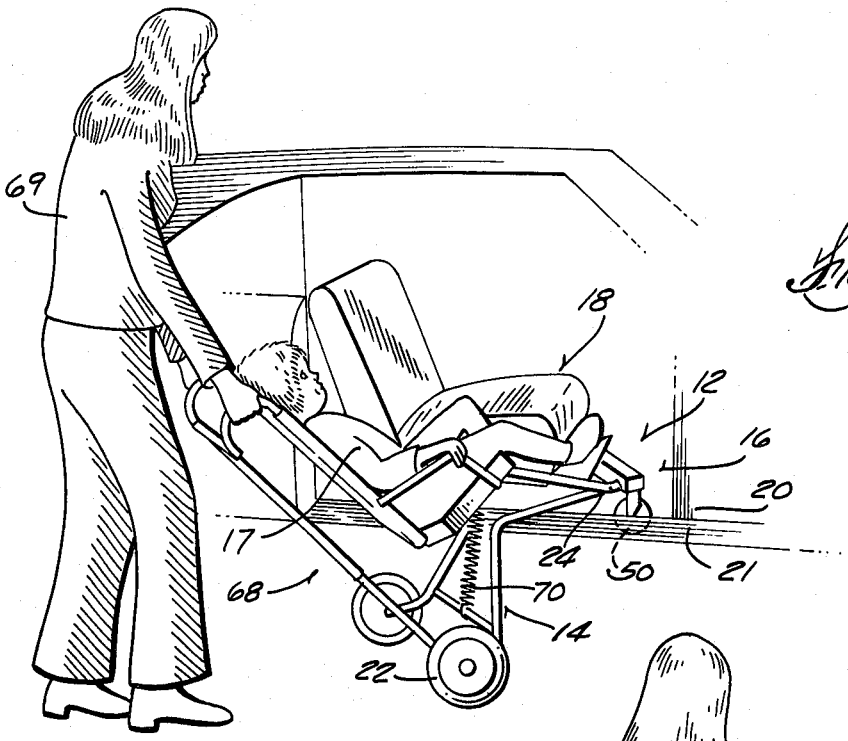
FIG. 6 is a perspective view showing the first step in placing the chair of FIGS. 1–4, along with its passenger, on an automobile seat.
Figure 7:
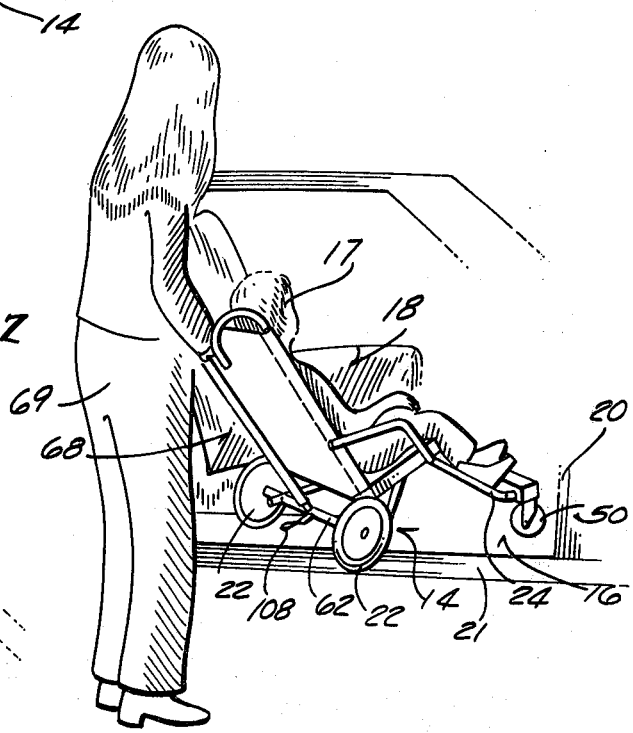
FIG. 7 is a perspective view showing the second step in placing the chair of FIGS. 1–4, along with its passenger, on an automobile seat.
Figure 8:
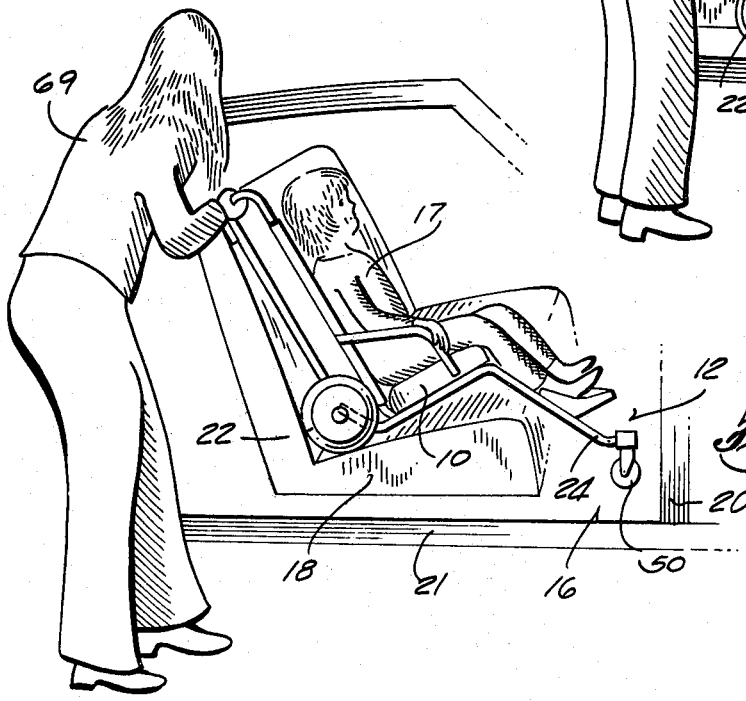
FIG. 8 is a perspective view showing the third step in placing the chair of FIGS. 1–4, along with its passenger, on an automobile seat.

FIGS. 1–4 show the structure of a preferred embodiment of folding wheel chair and FIGS. 6–8 show how this embodiment is placed on an automobile seat. Referring to FIGS. 1–4, this embodiment includes a seat portion 10 which is supported by a seat frame described hereinafter, a front wheel assembly 12, and a rear wheel assembly 14. The front wheel assembly 12 is dimensioned so that it will easily pass through the space 16 (FIG. 6) between a seat 18 of an automobile and the doorframe 20 thereof. It may consist of a single wheel or two closely spaced wheels 50 as illustrated herein. The rear wheel assembly 14 is retractable upwardly under the seat portion 10 to a position (FIG. 8) which permits seat portion 10 and rear wheel assembly 14 to be set upon automobile seat 18, which may be either a front seat or a rear seat.

Figure 2:
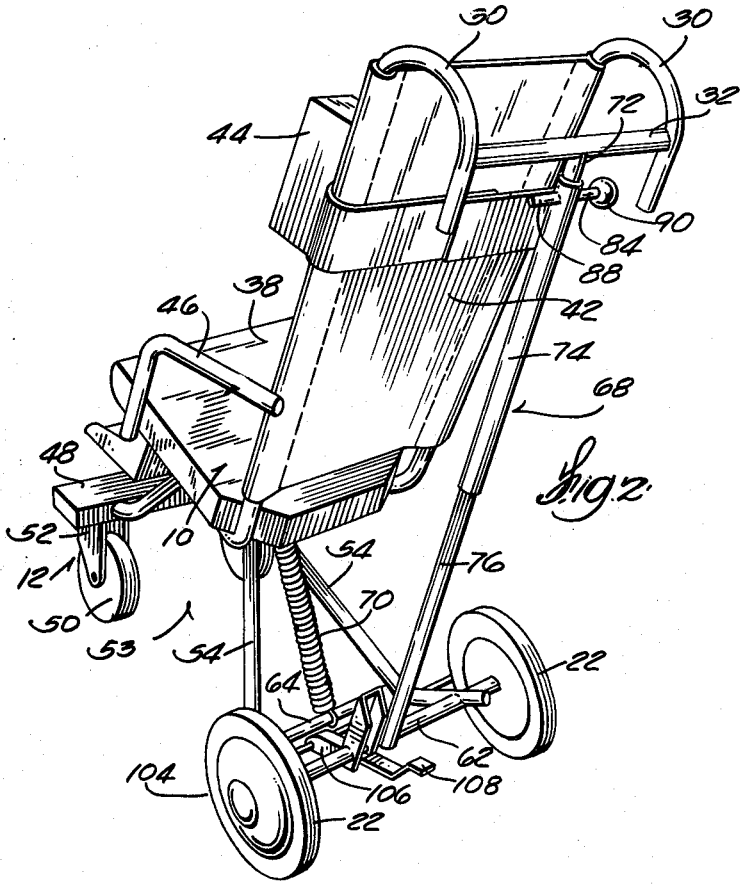
FIG. 2 is a rear perspective view of the embodiment shown in FIG. 1.
Figure 4:
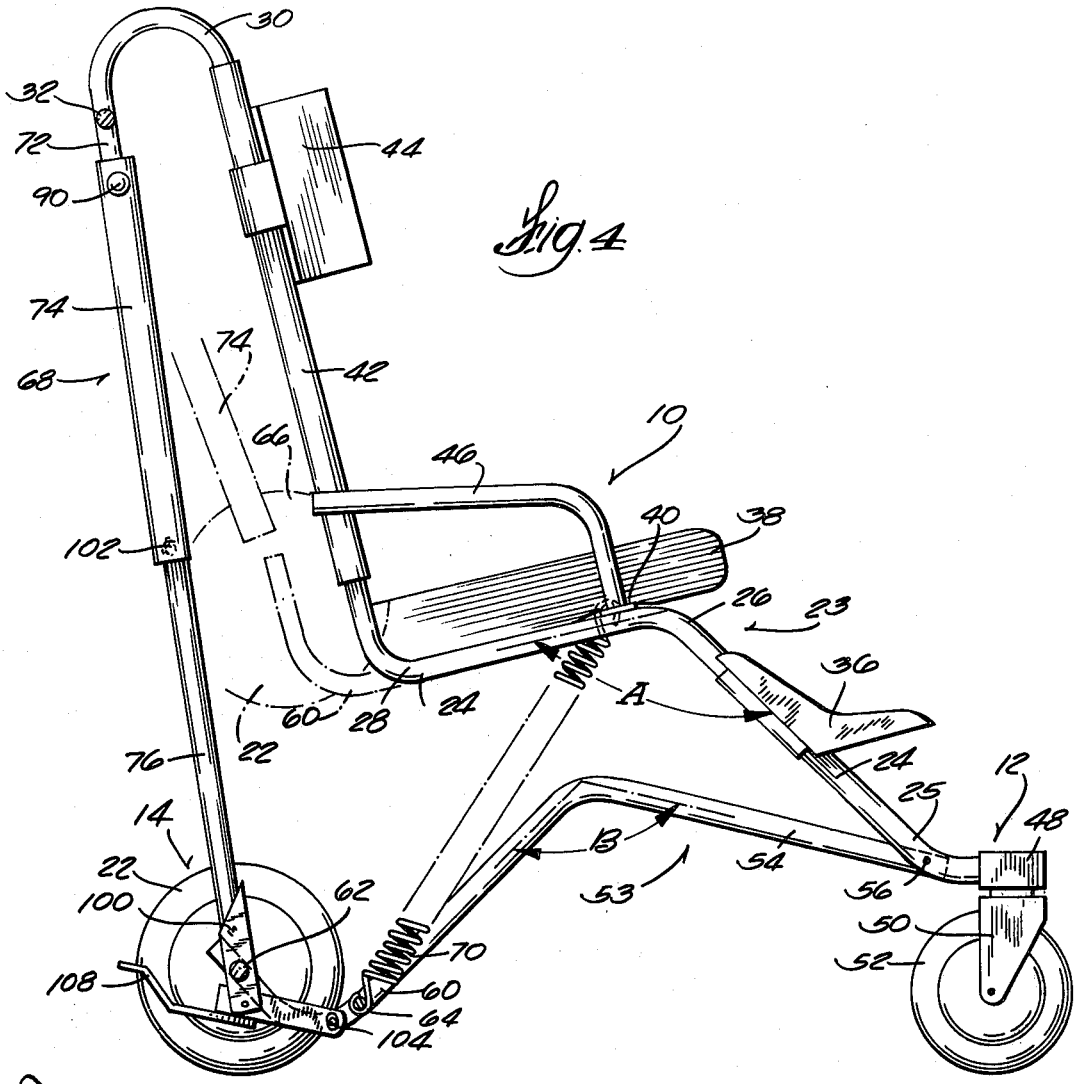
FIG. 4 is a side elevation view of the embodiment shown in FIGS. 1–3.

The chair frame 23 desirably comprises two chrome-plated steel tubes 24 (FIG. 4) which are bent at 25, 26, 28 and 30 and are joined together at their upper extremities by a chrome-plated steel crossbar tube 32 (FIG. 2). The portion of tubes 24 between bends 25 and 26 constitutes the front leg portion of the seat frame and supports a molded plastic footrest 36 which is clamped to tubes 24 by conventional means not shown and is adjustable in its position along the front leg portion of tubes 24. The portion of tubes 24 between bends 26 and 28 constitutes the seat portion of the seat frame and supports a conventional upholstered seat 38. Seat 38 is supported at its front margin by a rectangular, chrome-plated steel crossbar 40 (FIG. 1) that rests upon tubes 24 and is attached thereto by conventional means not shown. At its rear margin, seat 38 is supported by the tubes 24 and is attached thereto by conventional means not shown. The portion of tubes 24 between bends 28 and 30 constitutes the back portion of the seat frame and supports a conventional flexible fabric or plastic back panel 42 which spans between the spaced tubes 24. A pair of adjustable head support pads 44 are optionally attached between tubes 24 over back 42. A pair of bent, chrome-plated steel tubes 46 are connected by conventional means between the ends of crossbar 40 and the back portion of tubes 24 to help support the back portion and serve as arm rests. Arm rest cushions may be attached over the top of tubes 46, if desired.

At the forward ends of tubes 24, beyond the bend 25, a front wheel assembly 12 comprising a rectangular, chrome-plated steel box 48, and a pair of front wheels 50 with caster brackets 52 is attached. Box 48 is welded to the bottom ends of tubes 24 and caster brackets 52 are pivotally connected thereto by conventional means not shown. Front wheel assembly 12 is dimensioned to easily pass through the space 16 (FIG. 6) between a seat 18 of an automobile and the doorframe 20 thereof. For this purpose the wheels 52 are relatively small and are spaced relatively close together. The fact that angle A of bend 26 (FIG. 4) is an obtuse angle also helps in passing wheel assembly 12 through space 16 because the obtuse angle A extends and spaces front wheel assembly 12 substantially ahead of seat portion 10. This facilitates passing front wheel assembly 12 into and through the space 16, while the patient 17 is still outside of the automobile. The larger the size of angle A, the less degree of tilt is required in the back portion of the chair in the course of inserting front wheel assembly 12 through space 16. For the sake of appearance and to limit the length of the chair, angle A is preferably selected to be in the neighborhood of 125°. This value, however, is an example rather than a limitation, inasmuch as the value selected for angle A can be varied within reasonable limits without changing the basic structure of the wheel chair.

The rear wheel assembly 14 is mounted on a pivoted wheel frame or undercarriage 53 which comprises a pair of upwardly bowed or arched chrome-plated steel tubes 54 (FIG. 4) which are pivotally connected at their front end to tubes 25 by conventional means including a pivot pin 56 which extends through suitable journal openings in tubes 24 and 54. Tubes 54 of undercarriage 53 are bent upwardly at 58 to form an arch intermediate front wheel assembly 12 and the rear wheels 22. Tubes 54 are also bent at 60 and are joined together at their rear end by a chrome-plated steel axle 62 upon which the rear wheels 22 are journaled. Tubes 54 are also joined together by a chrome-plated steel crossbrace 64 which spans between tubes 54 immediately in front of rear wheels 22.

The arch 58 in tubes 54 is spaced approximately the same distance from pivot pin 56 as the bend 26 in tubes 24 and the angle B of bend 58 is approximately the same size as the angle A of bend 26. The tubes 54 are, however, spaced closer together than the tubes 24. Therefore, when the undercarriage including rear wheel assembly 14 is retracted upwardly so that the rear wheels 22 occupy the dashed line position indicated at 66 in FIG. 4, the tubes 54 of undercarriage 53 will interfit flush between the tubes 24 of chair frame 23. This geometry is desirable but not essential, inasmuch as will be shown hereinafter in connection with a second embodiment (FIG. 5), the chair will still fit on the automobile seat 18 when the values for angles A and B are different.

The chair frame tubes 24 are supported above the undercarriage frame tubes 54 by a chrome-plated steel telescoping tube assembly 68 which functions as a retractable strut and which is welded at its top end to crossbar 32 and is welded at its bottom end to axle 62. When strut 68 is extended and locked, it supports chair frame tubes 24 in the full line position of parts indicated in FIG. 4. To retract undercarriage 53, to place the wheel chair on an automobile seat, strut 68 may be telescoped or retracted, whereupon the undercarriage parts will assume their position shown in broken lines in FIG. 4.

The retraction of undercarriage 53 is desirably powered by spring 70, which is connected between crossbrace 40 and crossbrace 64. When the latch 93 for strut 68 is released, spring 70 draws rear wheel assembly 14 upwardly until rear wheels 22 occupy the position indicated by dashed lines 66 in FIG. 4. In this position, rear wheel frame tubes 54 interfit flush with seat frame tubes 24 and the chair seat portion 10 and retracted rear wheel assembly 14 may be set upon an automobile seat as shown in FIG. 8. Because of bend 60 in tube 54, rear wheels 22 clear the bottom of seat portion 10 in the retracted position.

Figure 1:
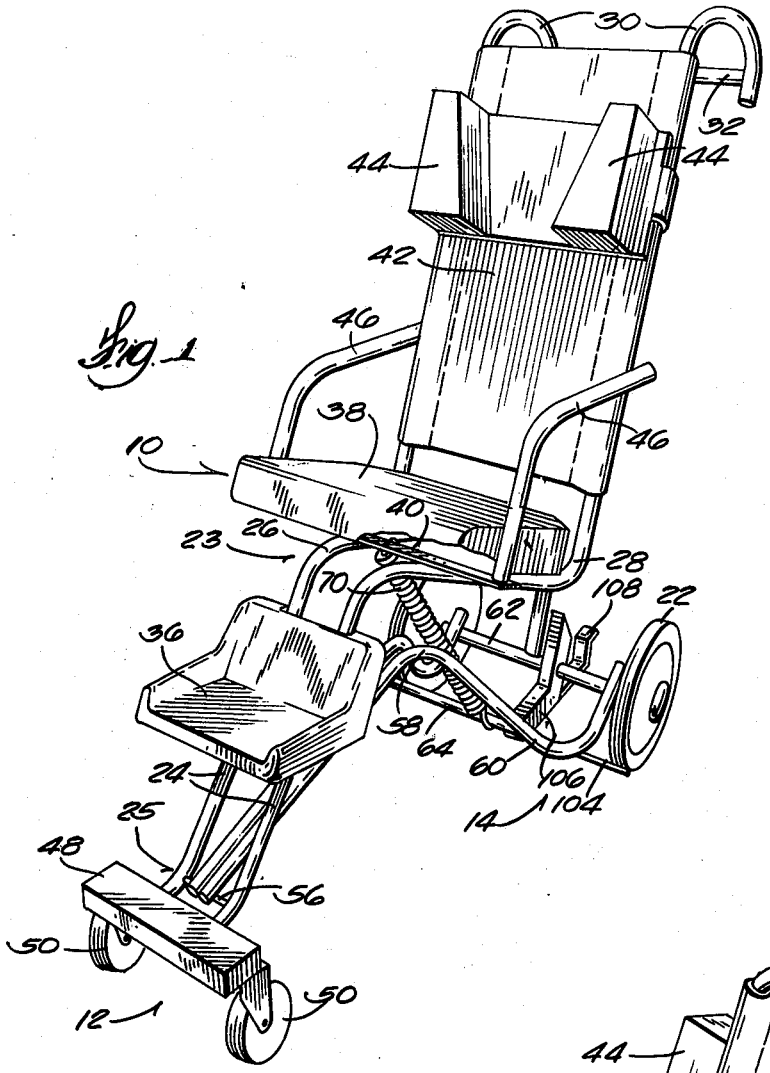
FIG. 1 is a front perspective view of a wheel chair embodying the invention.
Figure 3:
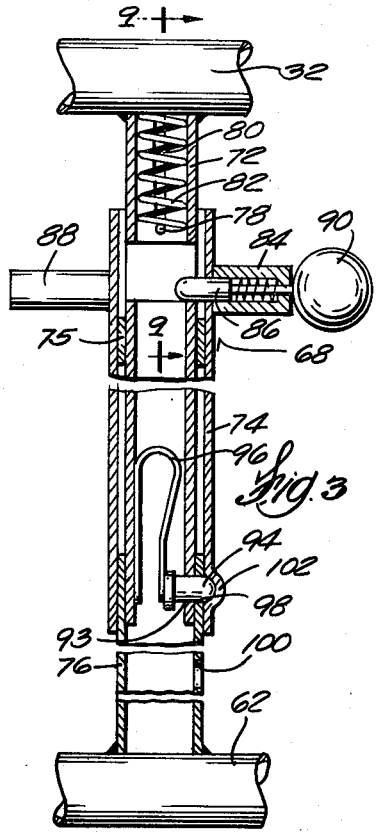
FIG. 3 is an enlarged fragmentary longitudinal sectional detail view of the latching mechanism for the embodiment shown in FIGS. 1 and 2.
Figure 9:
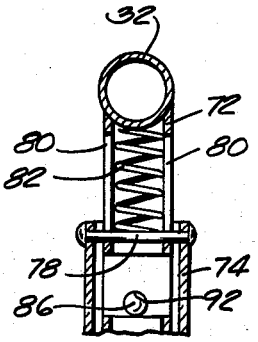
FIG. 9 is a fragmentary longitudinal sectional view taken along the line 9—9 of FIG. 3.

Telescoping tube assembly or strut 68 includes a chrome-plated steel inner tube 72, which is welded to crossbrace 32 and depends downwardly therefrom. Inner tube 72 is surrounded by chrome-plated steel outer tube 74, which serves as a latch actuator, and a chrome-plated steel intermediate tube 76, which is welded to axle 62 and projects upwardly therefrom and is slidably engaged between inner tube 72 and outer tube 74. A sleeve bushing 75 is attached to inner tube 72 and slidably engages outer tube 74. As best shown in FIG. 9, a pin 78 spans across the outer tube 74, near its top end, and rides in longitudinally extending slots 80 formed near the top end of inner tube 72. A compression spring 82 within the top end of inner tube 72 urges pin 78 and outer tube 74 downwardly. Thus outer tube 74 is slidably connected to inner tube 72 by pin 78 and spring 82 and may be moved upwardly and downwardly with respect to inner tube 72.

A laterally projecting hollow handle 84 (FIG. 3) containing a spring loaded latch plunger 86 is welded on one side of the top portion of outer tube 74 and a coaxial solid handle 88 is welded to the other side of tube 74. A spherical knob 90 is attached to the outer end of latch plunger 86 to enable the same to be manually drawn outwardly. Latch plunger 86 normally extends through a circular opening 92 (FIG. 9) in inner tube 72 to latch outer tube 74 thereto. When plunger 86 is manually drawn outwardly, it releases outer tube 74 for up and down movement relative to inner tube 72.

At the bottom end of inner tube 72, a latch detent plunger 94 normally latches inner strut tube 72 to intermediate strut tube 76, thus to hold the strut 68 in extended position. Detent plunger 94 is guided for lateral movement in socket 93 formed in the side wall of tube 72, near its lower end. Detent 94 is spring loaded outwardly toward engagement with an opening 98 formed in the side wall of intermediate tube 76, near its top, by a U-shaped spring 96. When thus engaged, detent 94 latches tube assembly 68 in its extended position. Withdrawal of detent 94 from opening 98 releases intermediate tube 76 to be slid upwardly between inner tube 72 and outer tube 74 until opening 100 near the lower end of strut tube 76 comes opposite spring-biased detent 94, whereupon spring 96 advances detent 94 into engagement with opening 100 and locks the tube assembly 68 in its retracted position. Outer tube or sleeve 74 is used as a latch actuator. For this purpose, it is provided with a cam dimple 102 aligned with detent 94 when latch plunger 86 locks tubes 72, 74 together. In this position (FIG. 3), the relief provided by dimple 102 allows detent 94 to fully engage into opening 98.

To unlatch tube assembly 68, the operator grasps knob 90 and pulls it outwardly. This disengages plunger 86 from opening 92 in inner tube 72 and frees outer tube 74 for up and down movement with respect to inner tube 72. The operator then draws handle 84 upwardly, which causes the dimple 102 to cam against the rounded end of detent 94 and force it inwardly until its rounded end is within opening 98 in tube 76. Any slight upward pressure on tube 76 will now cam the edges of opening 98 against the rounded end of detent 94 to complete its retraction and allow tube 76 to telescope into tube 74.

The upward pressure of spring 70 (FIG. 2) on axle 62 is sufficient to complete retraction of detent 94 and cause tube 76 to slide upwardly between tubes 72 and 74, thereby telescoping or retracting tube assembly 68. When tube 76 reaches its upward limit of movement, opening 100 aligns with detent plunger 94 which advances under pressure of spring 96 to latch tube assembly 68 in its telescoped or retracted position.

The wheel chair and patient can then be placed on an automobile seat, as hereinafter described. When the wheel chair is removed from the automobile, it is necessary to move tube assembly or strut 68 from its retracted position to its extended position. This is done by first unlatching intermediate tube 76 for movement in the manner described above. Next, the operator places his foot on axle 62 and forces tube 76 downwardly until opening 98 re-engages plunger 94 to latch telescoping tube assembly or strut 68 in its extended position.

FIGS. 6–8 show how the above-described wheel chair and patient may be maneuvered into and out of an automobile without removing the patient from the chair. Although a child patient 17 is shown in the wheel chair in FIGS. 6–8, it should be understood that the wheel chair of this invention may be sized for either children or adults. The process of loading and unloading is the same in either case.

First, the wheel chair is moved by attendant 69 to the side of the automobile adjacent to the open door with the front wheel assembly 12 of the wheel chair facing the front of the automobile.

Next, the wheel chair is tipped back on its rear wheel assembly 14 as shown in FIG. 6 and is moved forward to pass front wheel assembly 12 through the space 16 between seat 18 and doorframe 20. The front wheels 50 are set down on the floor of the automobile and the forward ends of chair frame 24 may rest on the door sill 21.

Next, the telescoping tube assembly or strut 68 is unlatched, in the manner described above. For this purpose the attendant 69 will typically steady the chair with one hand on a hand grip 30, while using his other hand to retract latch knob 90. The undercarriage 53 and rear wheels 22 will be raised by spring 70 to the retracted position shown in FIGS. 4 and 7. While rear wheels 22 are being raised, the weight of the wheel chair and the occupant thereof is supported in the front by the front wheel assembly 12 and/or the bearing of seat frame 24 on the door sill 21 and in the rear by the attendant. As soon as the undercarriage 53 and rear wheels 22 are raised, the wheel chair is moved sideways until the seat portion 10 and retracted wheels 22 rest on top of the automobile seat 18, as shown in FIG. 8. A seat belt may then be placed around the patient while he remains seated in the chair. The upward arch 58 of undercarriage 53 clears the undercarriage 53 from interference with the seat 18 so that the chair receives firm support from its rear wheels 22 and/or the rear ends of the undercarriage which have broad-based contact with the seat. The front end of the chair receives firm support from the automobile floor. The undercarriage has no intermediate contact with the seat 18, thus to avoid any tendency to tip or rock thereabout.

To remove the wheel chair and its occupant from the automobile, the seat belt is first unbuckled, then the rear end of the wheel chair is moved away from automobile seat 18 until the rear wheels 22 are clear of seat 18 as shown in FIG. 7. Then the attendant unlatches the telescoping tube assembly 68 in the manner described above and places his foot on axle 62 and pushes it down to extend tube assembly 68 to the position shown in FIG. 6 and latch it in this position. The rear wheels 22 are then placed on the ground and the wheel chair is tilted backward until the front wheel assembly 12 is clear of the automobile sill and can be withdrawn therefrom and lowered into contact with the ground.

It will be clear from the foregoing that the procedure for placing the wheel chair of this invention into an automobile and for removing it therefrom is much simpler and more convenient and less stressful to the patient than the procedure used in the prior art, which involved switching the patient from the chair to the automobile seat and then folding and carrying the chair separately.

The chair embodiment illustrated in FIGS. 1–4 is preferably equipped with a brake rod 104 (FIGS. 1 and 2) which is movably mounted on a bracket 106 which is attached to axle 62. Brake rod 104 extends parallel to axle 62 adjacent to the tires of rear wheels 22 and can be pressed against the tires by a conventional foot pedal 108 to lock rear wheels 22 in one position. This brake mechanism may be used when the wheel chair is parked on a slope or in other situations where it is desirable to keep the wheel chair from moving.

Figure 5:
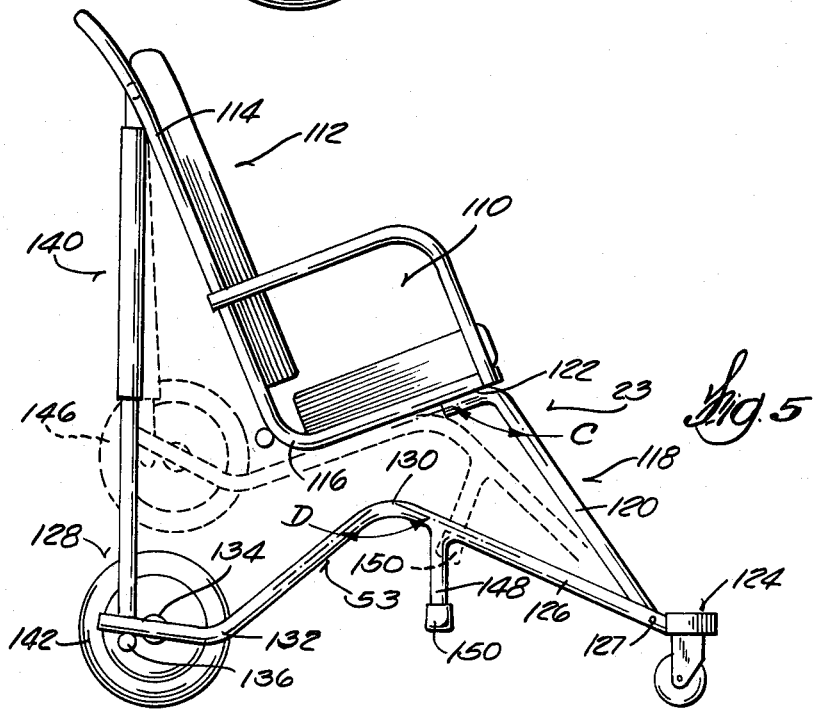
FIG. 5 is a side elevation view of another embodiment of the invention.

FIG. 5 shows another embodiment of the invention in which a seat portion 110 and back portion 112 are supported by a pair of chrome-plated steel tubes 114 which are bent at right angles at 116. The front leg portion 118 of this embodiment is formed by another pair of chrome-plated steel tubes 120 which are welded to tubes 114 at 122 and project downwardly therefrom at an obtuse angle C to the bottom of seat portion 110. In this embodiment, the front wheel assembly 124 is not rigidly attached to the leg tubes 120. Instead, it is rigidly attached to a pair of chrome-plated steel tubes 126 which extend between front wheel assembly 124 and rear wheel assembly 128. Tubes 120 are pivotally connected to undercarriage tubes 126 by a pin 127 near the front wheel assembly 124. Undercarriage tubes 126 are bent at 130 at an angle D which is slightly larger than angle C and are bent at 132 near axle 134, which is rigidly connected therebetween. A crossbrace 136 is connected between the rear of tubes 126 and a telescoping tube assembly or strut 140 is connected to crossbrace 136 at its bottom and is connected to back portion 112 at its top.

When it is desired to retract undercarriage 126 and rear wheels 142, telescoping tube assembly 140 can be telescoped or retracted in the same manner previously described, to permit wheels 142 to be raised to the position 146 indicated by the dashed lines in FIG. 5. Telescoping tube assembly 140 is the same as tube assembly 68 and may be extended and retracted in the same manner.

In this embodiment, a pair of downwardly projecting stub legs 148 having rubber caps 150 at their lower ends are welded to tubes 126 between front wheel assembly 124 and rear wheel assembly 128. Legs 148 are of such length and are so positioned as to rest upon the front door sill of an automobile when the wheel chair is being loaded into the automobile to help support the wheel chair during loading and unloading. However, legs 148 are not long enough to interfere with placing the wheel chair on the automobile seat. As shown in FIG. 8, there is enough room between the chair frame and the automobile seat 18 to accommodate the legs 148.

In loading the embodiment of FIG. 5 on the seat of an automobile, the legs 148 are rested on the automobile door sill in the first step of the procedure, with the front wheel assembly 124 being held above the floorboards. Then the telescoping tube assembly 140 is unlatched, and the weight of the wheel chair and occupant thereof is supported by the legs 148. The pressure caused by the weight of the occupant on pivot pin 127 then causes the undercarriage tubes 126 to rotate upwardly to the retracted position shown by the dashed line in FIG. 5. Telescoping tube assembly 140 is then latched in its retracted position. Next, the chair is tilted forwardly to engage the front wheel assembly 124 on the floorboards and the seat portion 110 is lifted and moved sideways onto the automobile seat.

In unloading this embodiment, the rear wheel assembly 128 does not have to be pushed down since it will fall due to the force of gravity when telescoping tube assembly 140 is unlatched.

In all embodiments of the invention the front leg of the chair frame is narrow, thus to pass easily through the space between the door frame and seat. The footrest 36, when used, is also narrow enough to pass through said space. The rear wheel assembly is wider, thus to give the chair stability, both while in motion and while resting on the automobile seat.

I claim:

1. In a wheel chair having a seat portion, a front leg portion, and a rear wheel assembly, the improvement wherein said front leg portion is so dimensioned as to be insertable through the space between the doorframe of an automobile and one of the seats thereof whereby said front leg portion is placed in support relation to the automobile and will support the seat portion from the automobile in the course of subsequent movement of the wheel chair into the automobile, and *retractor* means for *assisting the attendant in* retracting said rear wheel assembly upwardly independently of any change in the position of the front leg portion with respect to the seat portion *while the front leg portion is supported on the automobile* and to a position which clears the space beneath the rear end of the chair and permits the chair seat portion and retracted rear wheel assembly to be swung over and set upon said automobile seat.

2. [The invention of claim 1] *In a wheel chair having a seat portion, a front leg portion, and a rear wheel assembly, the improvement wherein said front leg portion is so dimensioned as to be insertable through the space between the doorframe of an automobile and one of the seats thereof whereby said front leg portion is placed in support relation to the automobile and will support the seat portion from the automobile in the course of subsequent movement of the wheel chair into the automobile, and means for retracting said rear wheel assembly upwardly independently of any change in the position of the front leg portion with respect to the seat portion and to a position which clears the space beneath the rear end of the chair and permits the chair seat portion and retracted rear wheel assembly to be swung over and set upon said automobile seat, and* wherein said wheel chair has a chair frame including back portion extending upwardly from said seat portion and a front leg portion extending downwardly from said seat portion, and wherein said rear wheel assembly includes a rear wheel frame that extends forwardly from said rear wheels and wherein said means for retracting said rear wheel assembly includes means pivotally connecting the front of said rear wheel frame to said chair frame, and a retractable strut connecting between said rear wheel assembly and said chair frame to support the wheel chair on the rear wheel assembly and to retract the rear wheel assembly upwardly under the chair seat portion by swinging said rear wheel frame upwardly.

3. [The invention of claim 2] *In a wheel chair having a seat portion, a front leg portion, and a rear wheel assembly, the improvement wherein said front leg portion is so dimensioned as to be insertable through the space between the doorframe of an automobile and one of the seats thereof whereby said front leg portion is placed in support relation to the automobile and will support the seat portion from the automobile in the course of subsequent movement of the wheel chair into the automobile, and means for retracting said rear wheel assembly upwardly independently of any change in the position of the front leg portion with respect to the seat portion and to a position which clears the space beneath the rear end of the chair and permits the chair seat portion and retracted rear wheel assembly to be swung over and set upon said automobile seat, and wherein said wheel chair has a chair frame including back portion extending upwardly from said seat portion and a front leg portion extending downwardly from said seat portion, and wherein said rear wheel assembly includes a rear wheel frame that extends forwardly from said rear wheels and wherein said means for retracting said rear wheel assembly includes means pivotally connecting the front of said rear wheel frame to said chair frame, and a retractable strut connecting between said rear wheel assembly and said chair frame to support the wheel chair on the rear wheel assembly and to retract the rear wheel assembly upwardly under the chair seat portion by swinging said rear wheel frame upwardly, and* wherein said rear wheel frame comprises an upwardly arched undercarriage extending between said chair frame and rear wheels.

4. [The invention of claim 3] *In a wheel chair having a seat portion, a front leg portion, and a rear wheel assembly, the improvement wherein said front leg portion is so dimensioned as to be insertable through the space between the doorframe of an automobile and one of the seats thereof whereby said front leg portion is placed in support relation to the automobile and will support the seat portion from the automobile in the course of subsequent movement of the wheel chair into the automobile, and means for retracting said rear wheel assembly upwardly independently of any change in the position of the front leg portion with respect to the seat portion and to a position which clears the space beneath the rear end of the chair and permits the chair seat portion and retracted rear wheel assembly to be swung over and set upon said automobile seat, and wherein said wheel chair has a chair frame including back portion extending upwardly from said seat portion and a front leg portion extending downwardly from said seat portion, and wherein said rear wheel assembly includes a rear wheel frame that extends forwardly from said rear wheels and wherein said means for retracting said rear wheel assembly includes means pivotally connecting the front of said rear wheel frame to said chair frame, and a retractable strut connecting between said rear wheel assembly and said chair frame to support the wheel chair on the rear wheel assembly and to retract the rear wheel assembly upwardly under the chair seat portion by swinging said rear wheel frame upwardly, and wherein said rear wheel frame comprises an upwardly arched undercarriage extending between said chair frame and rear wheels, and* wherein the arch of said undercarriage substantially matches the angle between said seat portion and said front leg portion whereby said undercarriage swings into close proximity to said leg portion and seat portion when said rear wheel assembly is retracted.

5. [The invention of claim 3] *In a wheel chair having a seat portion, a front leg portion, and a rear wheel assembly, the improvement wherein said front leg portion is so dimensioned as to be insertable through the space between the doorframe of an automobile and one of the seats thereof whereby said front leg portion is placed in support relation to the automobile and will support the seat portion from the automobile in the course of subsequent movement of the wheel chair into the automobile, and means for retracting said rear wheel assembly upwardly independently of any change in the position of the front leg portion with respect to the seat portion and to a position which clears the space beneath the rear end of the chair and permits the chair seat portion and retracted rear wheel assembly to be swung over and set upon said automobile seat, and wherein said wheel chair has a chair frame including back portion extending upwardly from said seat portion and a front leg portion extending downwardly from said seat portion, and wherein said rear wheel assembly includes a rear wheel frame that extends forwardly from said rear wheels and wherein said means for retracting said rear wheel assembly includes means pivotally connecting the front of said rear wheel frame to said chair frame, and a retractable strut connecting between said rear wheel assembly and said chair frame to support the wheel chair on the rear wheel assembly and to retract the rear wheel assembly upwardly under the chair seat portion by swinging said rear wheel frame upwardly, and wherein said rear wheel frame comprises an upwardly arched undercarriage extending between said chair frame and rear wheels, and* wherein said chair frame comprises spaced support tubes, said upwardly arched undercarriage fitting between said tubes when the undercarriage is retracted.

6. The invention of claim 2 wherein said retractable strut comprises a telescoping tube assembly comprising an inner tube which is connected at its top to said back portion and extends downwardly therefrom, an outer tube which surrounds said inner tube and is slidably attached to the top thereof, an intermediate tube which is connected at its bottom end to said rear wheel assembly and projects upwardly therefrom, said intermediate tube being slidably contained between said inner tube and said outer tube, a latch plunger attached within said inner tube and projecting radially therefrom, and a first and second latch opening in said intermediate tube, said first opening being positioned to engage said latch plunger when said telescoping tube assembly is in its extended position, and said second opening being positioned to engage said latch plunger when said telescoping tube assembly is in its retracted position.

7. The invention of claim 6 wherein said outer tube is provided with a latch plunger cam opposite said latch plunger whereby displacement of said outer tube with respect to the inner tube will cam actuate the latch plunger, thereby unlatching said latch plunger from said first or second latch opening and freeing said intermediate tube for movement.

8. [The invention of claim 2] *In a wheel chair having a seat portion, a front leg portion, and a rear wheel assembly, the improvement wherein said front leg portion is so dimensioned as to be insertable through the space between the doorframe of an automobile and one of the seats thereof whereby said front leg portion is placed in support relation to the automobile and will support the seat portion from the automobile in the course of subsequent movement of the wheel chair into the automobile, and means for retracting said rear wheel assembly upwardly independently of any change in the position of the front leg portion with respect to the seat portion and to a position which clears the space beneath the rear end of the chair and permits the chair seat portion and retracted rear wheel assembly to be swung over and set upon said automobile seat, and wherein said wheel chair has a chair frame including back portion extending upwardly from said seat portion and a front leg portion extending downwardly from said seat portion, and wherein said rear wheel assembly includes a rear wheel frame that extends forwardly from said rear wheels and wherein said means for retracting said rear wheel assembly includes means pivotally connecting the front of said rear wheel frame to said chair frame, and retractable strut connecting between said rear wheel assembly and said chair frame to support the wheel chair on the rear wheel assembly and to retract the rear wheel assembly upwardly under the chair seat portion by swinging said rear wheel frame upwardly, and* wherein said rear wheel frame is arched between said front wheel assembly and rear wheels, a leg attached to said rear wheel frame in the arched portion thereof and positioned to rest upon the automobile door sill to support the wheel chair and its occupant during the time period in which said rear wheel assembly is being retracted, whereby the downward pressure due to the weight of said occupant on the pivotal connection between said front leg portion and rear wheel frame causes the rear wheel frame to pivot upwardly toward its retracted position.

9. [The invention of claim 2] *In a wheel chair having a seat portion, a front leg portion, and a rear wheel assembly, the improvement wherein said front leg portion is so dimensioned as to be insertable through the space between the doorframe of an automobile and one of the seats thereof whereby said front leg portion is placed in support relation to the automobile and will support the seat portion from the automobile in the course of subsequent movement of the wheel chair into the automobile, and means for retracting said rear wheel assembly upwardly independently of any change in the position of the front leg portion with respect to the seat portion and to a position which clears the space beneath the rear end of the chair and permits the chair seat portion and retracted rear wheel assembly to be swung over and set upon said automobile seat, and wherein said wheel chair has a chair frame including back portion extending upwardly from said seat portion and a front leg portion extending downwardly from said seat portion, and wherein said rear wheel assembly includes a rear wheel frame that extends forwardly from said rear wheels and wherein said means for retracting said rear wheel assembly includes means pivotally connecting the front of said rear wheel frame to said chair frame, and a retractable strut connecting between said rear wheel assembly and said chair frame to support the wheel chair on the rear wheel assembly and to retract the rear wheel assembly upwardly under the chair seat portion by swinging said rear wheel frame upwardly,* and further comprising spring means connected between said seat portion and said rear wheel frame for urging said rear wheel frame upwardly under said seat portion, and latch means on said retractable strut for latching the same in an extended position to support said rear wheel frame in a lowered position against the urging of said spring means, and means for unlatching said latch means to permit said spring means to lift said rear wheel assembly into a retracted position under said seat portion.

10. [The invention of claim 2] *In a wheel chair having a seat portion, a front leg portion, and a rear wheel assembly, the improvement wherein said front leg portion is so dimensioned as to be insertable through the space between the doorframe of an automobile and one of the seats thereof whereby said front leg portion is placed in support relation to the automobile and will support the seat portion from the automobile in the course of subsequent movement of the wheel chair into the automobile, and means for retracting said rear wheel assembly upwardly independently of any change in the position of the front leg portion with respect to the seat portion and to a position which clears the space beneath the rear end of the chair and permits the chair seat portion and retracted rear wheel assembly to be swung over and set upon said automobile seat, and wherein said wheel chair has a chair frame including back portion extending upwardly from said seat portion and a front leg portion extending downwardly from said seat portion, and wherein said rear wheel assembly*

*includes a rear wheel frame that extends forwardly from said rear wheels and wherein said means for retracting said rear wheel assembly includes means pivotally connecting the front of said rear wheel frame to said chair frame, and a retractable strut connecting between said rear wheel assembly and said chair frame to support the wheel chair on the rear wheel assembly and to retract the rear wheel assembly upwardly under the chair seat portion by swinging said rear wheel frame upwardly, and* wherein said rear wheel assembly includes an axle, said axle being rigidly attached to said rear wheel frame, and further comprising a right angle bend in said rear wheel frame in front of said axle for placing the rear wheels above the bottom of said seat portion in the retracted position of said rear wheel assembly.

11. The invention of claim 1 in which said front leg portion includes a wheel assembly narrow enough to pass through said space.

* * * * *